United States Patent

Reynolds et al.

Patent Number: 5,370,013
Date of Patent: Dec. 6, 1994

[54] HELICALLY GEARED COMPOUND TRANSMISSION

[75] Inventors: Joseph D. Reynolds, Climax; Alan C. Stine, Kalamazoo, both of Mich.

[73] Assignee: Eaton Corporation, Cleveland, Ohio

[21] Appl. No.: 63,829

[22] Filed: May 20, 1993

[51] Int. Cl.$^5$ .................................. F16H 3/08
[52] U.S. Cl. .............................. 74/330; 74/331
[58] Field of Search .............. 74/325, 329, 330, 331

[56] References Cited

U.S. PATENT DOCUMENTS

| | | | |
|---|---|---|---|
| 4,226,135 | 10/1980 | Winter | 74/330 |
| 4,375,171 | 3/1983 | Morscheck | 74/331 |
| 4,627,301 | 12/1986 | Bainbridge et al. | 74/333 |
| 4,754,665 | 7/1988 | Vandervoort | 74/745 |
| 4,802,375 | 2/1989 | Stodt | 74/331 |
| 4,831,894 | 5/1989 | Braun | 74/331 |
| 4,944,197 | 7/1990 | Stine et al. | 74/477 |

Primary Examiner—John J. Vrablik
Attorney, Agent, or Firm—Howard D. Gordon

[57] ABSTRACT

A compound helically geared transmission (310) of lighter weight and/or shorter axial length than comparable prior art transmissions is provided. The compound helically geared transmission of the present invention utilizes main and auxiliary section countershafts (324, 362) which are coaxial and supported solely by bearings in the transmission housing (316) forward and rearward end walls (316A, 316B). The mainshaft (362) is supported solely by tapered surfaces at the forward and rearward ends thereof, which abut complimentary tapered surfaces on or carried by the rearward end of the input shaft (318) and forward end of the output shaft (358).

37 Claims, 7 Drawing Sheets

FIG. 5 ated by reference. Another example is the "Ecosplit" model of transmission sold by Zahnradfabrik Friedrichshafen Aktiengeseushaft of Friedrichshafen, Federal Republich of Germany which utilizes a separate splitter auxiliary section in front of, and a separate range auxiliary section behind, the main transmission section.

HELICALLY GEARED COMPOUND TRANSMISSION

RELATED APPLICATIONS

This application is related to U.S. patent application Ser. No. 08/063,792 titled COMPOUND TRANSMISSION, assigned to the same assignee, Eaton Corporation, as the application and filed the same day, Jun. 20, 1993 as this application.

BACKGROUND OF THE INVENTION

1. Field of the Invention

The present invention relates to an improved helically geared compound mechanical change gear transmission structure, preferably for vehicular compound transmissions of the multiple substantially identical countershaft type. In particular, the present invention relates to an improved, helically geared, compound mechanical transmission structure allowing, for a given transmission capacity and life, the provision of a lighter, axially shorter and/or less costly transmission as compared to comparable prior an transmission structures.

2. Description of the Prior Art

Compound change gear transmissions, usually vehicular transmissions for heavy duty vehicles, of the type having one or more auxiliary sections connected in series with a main transmission section are well known in the prior art. Briefly, by utilizing main and auxiliary transmission sections connected in series, assuming proper sizing of the ratio steps, the total of available transmission ratios is equal to the product of the main and auxiliary section ratios. By way of example, at least in theory, a compound change gear transmission comprising a four (4) forward speed main section connected in series with a three (3) speed auxiliary section will provide twelve (4×3=12) available forward ratios.

Auxiliary transmission sections are of three general types: range type, splitter type or combined range/splitter type.

In compound transmissions having a range type auxiliary section, the auxiliary section ratio step or steps are greater than the total ratio coverage of the main transmission section ratios used in both ranges and the main section is shifted progressively through its ratios in each range. Examples of compound transmissions having range type auxiliary sections may be seen by reference to U.S. Pat. Nos. 3,105,395; 2,637,222 and 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having a splitter type auxiliary sections may be seen by reference to U.S. Pat. Nos. 4,290,515; 3,799,002; 4,440,037 and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing one or more of the main section ratios to be split in at least one range.

One example of a compound transmission having a single combined range/splitter type auxiliary section may be seen by reference to U.S. Pat. Nos. 3,283,613; 3,648,546, the disclosures of which are hereby incorporated by reference. Another example is the "Ecosplit" model of transmission sold by Zahnradfabrik Friedrichshafen Aktiengeseushaft of Friedrichshafen, Federal Republich of Germany which utilizes a separate splitter auxiliary section in front of, and a separate range auxiliary section behind, the main transmission section.

Another example of a compound vehicular transmission having a single combined three gear layer, four-speed combined splitter/range transmission may be seen by reference to U.S. Pat. Nos. 4,754,665 and 4,944,197, the disclosures of which are incorporated herein by reference.

It should be noted that the terms main and auxiliary sections are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forwards speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

The prior an compound change gear transmissions, especially the prior art compound transmissions of the type having both range and splitter type auxiliary section gearing, such as the "Roadranger" type and "Super 10" type offered by Eaton Corporation and the "Ecosplit" type offered by Zahnradfabrik Friedrichshafen Aktiengeseushaft, are well received and widely used in manually shifted heavy duty vehicles. However, these and other types of prior art compound change gear transmissions are not totally satisfactory as it is an ongoing objective, especially for vehicular transmissions, to provide transmissions of equal or improved capacities and reliability which use fewer pans and/or are axially shorter and/or lighter in weight as compared to prior art transmissions of comparable capacity and reliability.

SUMMARY OF THE INVENTION

In accordance with the present invention, helically geared compound transmissions of an improved structure are provided which use fewer parts and/or are axially shorter and/or of a lighter weight as compared to comparable prior art compound transmissions of equivalent capacity and reliability.

The above is accomplished by providing a compound helically geared transmission wherein (i) the main and auxiliary section countershafts form a coaxial assembly of countershafts supported solely by bearings in the front and rear end walls of the transmission housing, preferably one of the main and auxiliary section countershafts extend from the forward to the rearward housing end walls and the other of the countershafts is a generally tubular member surrounding and rotationally supported on the one countershaft and/or (ii) the mainshaft is supported, preferably in a radially floating manner, solely by the input and/or output shafts without intermediate bearings journalled in an intermediate housing wall. The above structure eliminates the requirement of all or a large portion of the intermediate housing wall(s) and the various shaft support bearings associated therewith which are necessary in comparable helically geared prior an compound transmission designs. Elimination of all or most of the housing intermediate wall and the associated bearings, bearing retainers and the like allows the provision of compound change gear transmissions of relatively lighter weight, shorter axial length and/or fewer parts as compared to comparable prior an transmissions.

Accordingly, it is an object of the present invention to provide a new and improved helically geared compound change gear transmission.

This and other objects and advantages of the present invention will become apparent from a reading of the detailed description of the preferred embodiment taken in connection with the attached drawings.

DESCRIPTION OF THE PREFERRED EMBODIMENT

Figure 1:
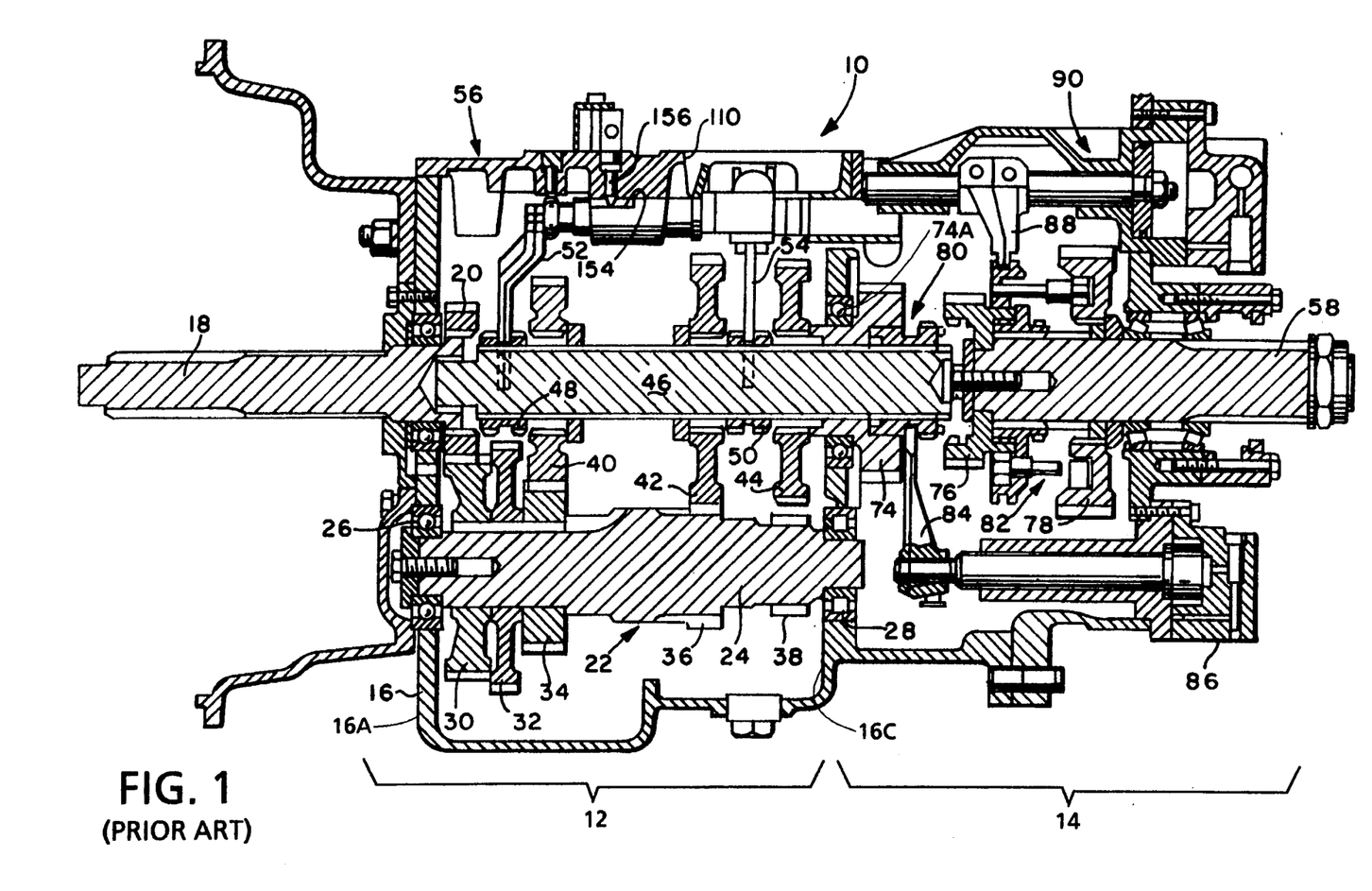
FIGS. 1 and 1A are cross-sectional views of a prior art compound transmission.

Certain terminology will be used in the following description for convenience only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in the vehicle, being respectfully to the left and right sides of the transmission as illustrated in FIGS. 1. The words "inwardly" and "outwardly" will refer to directions toward and away frown, respectively, the geometric center of the device and designated parts thereof. Said terminology includes the words above specifically mentioned, derivatives thereof and words of similar import.

The term "compound transmission" is used to designate a change speed or change gear transmission having a main transmission section and an auxiliary drive train unit, such as an auxiliary transmission section, connected in series whereby the selected gear reduction in the main transmission section may be compounded by further selected gear reduction in the auxiliary transmission section. The term "helically geared" transmission will designate a transmission wherein at least half of the forward speed gearing is helical. The term "upshift" as used herein shall mean the shifting from a lower speed gear ratio to a higher speed gear ratio and the term "downshift" as used herein shall mean the shifting from a higher speed gear ratio to a lower speed gear ratio. The terms "low speed gear" or "low gear" as used herein shall designate a gear utilized for relatively lower forward speed operation in a transmission, i.e., a set of gears having a higher ratio of reduction of output shaft speed relative to the speed of the input shaft. "Synchronized clutch assembly" and words of similar import shall designate a clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation and relative large capacity friction means are associated with the clutch members and are sufficient, upon initiation of a clutch engagement, to cause the clutch members and all members rotating therewith to rotate at a substantially synchronous speed.

Figure 1A:
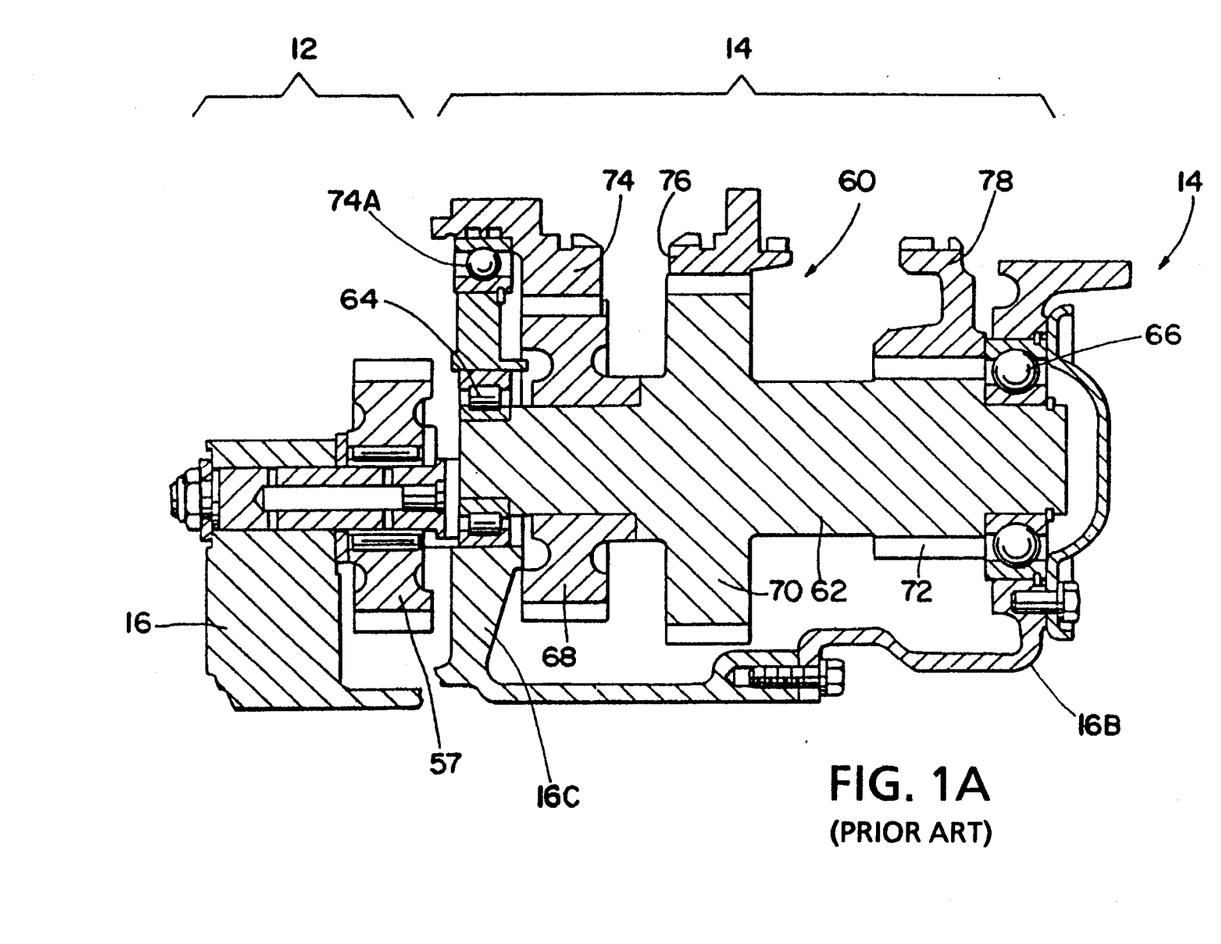

Referring now to FIGS. 1 and 1A, the prior an compound transmission 10 is illustrated. Transmission 10 comprises a main transmission section 12 connected in series with an auxiliary transmission section 14 having both range and splitter type gearing. Typically, transmission 10 is housed within a single multi-piece housing 16 and includes an input shaft 18 driven by a prime mover such as a diesel engine (not shown) through a selectively disengaged, normally engaged, friction master clutch (not shown).

In the main transmission section 12, the input shaft 18 carries an input gear 20 for driving at least one countershaft assembly 22. Preferably, as is well known in the prior an and as is illustrated in U.S. Pat. Nos. 3,105,395 and 3,335,616, the disclosures of which are hereby incorporated by reference, input gear 20 simultaneously drives a plurality of substantially identical mainsection countershaft assemblies at substantially identical rotational speeds. Each of the mainsection countershaft assemblies comprises a mainsection countershaft 24 supported by beatings 26 and 28 in housing 16 and is provided with mainsection countershaft gears 30, 32, 34, 36 and 38 fixed thereto. A plurality of mainsection drive or mainshaft gears 40, 42 and 44 surround the transmission mainshaft 46 and are selectively clutchable, one at a time, to the mainshaft 46 for rotation therewith by sliding clutch collars 48 and 50 as is well known in the an. Clutch collar 48 may also be utilized to clutch input gear 20 to the mainshaft 46 to provide a direct drive relationship between the input shaft 18 and the mainshaft 46. Preferably, each of the mainsection mainshaft gears encircles the mainshaft 46 and is in continuous meshing engagement with and is floatingly supported by the associated countershaft gear groups, which mounting means and special advantages resulting therefrom are explained in greater detail in above-mentioned U.S. Pat. Nos. 3,105,395 and 3,335,616. Typically, clutch collars 48 and 50 are axially positioned by means of shift forks or yokes 52 and 54, respectively, associated with a shift bar housing assembly 56. Clutch collars 48 and 50 are, in the illustrated preferred embodiment, of the well known non-synchronized double acting jaw clutch type but may also be of the synchronized type as illustrated in U.S. Pat. Nos. 4,989,706 and 5,141,087, the disclosures of which are incorporated herein by reference.

Main section mainshaft gear 44 is the reverse gear and is in continuous meshing engagement with countershaft gears 38 by means of conventional intermediate idler gears 57 (see FIG. 1A). Main section countershaft gear 32 is provided for powering power takeoff devices and the like. Jaw clutches 48 and 50 are three-position clutches in that they may be positioned in a centered axially nondisplaced, nonengaged position as illustrated or in a fully rightwardly engaged or fully leftwardly engaged position.

Auxiliary transmission section 14 is connected in series with main transmission section 12 and is of the three-layer, tour speed combined splitter/range type as illustrated in above-mentioned U.S. Pat. No. 4,754,665. Mainshaft 46 extends into the auxiliary section 14 and is journalled in the inward end of the output shaft 58 which extends from the rearward end of the transmission.

Auxiliary transmission section 14 includes a plurality of substantially identical auxiliary countershaft assemblies 60 (see FIG. 1A) each comprising an auxiliary countershaft 62 supported by bearings 64 and 66 in housing 16 and carrying three auxiliary section countershaft gears 68, 70 and 72 fixed for rotation therewith. Auxiliary countershaft gears 68 are constantly meshed with and support auxiliary section splitter gear 74. Auxiliary countershaft gears 70 are constantly meshed with and support auxiliary section splitter/range gear 76 which surrounds the output shaft 58 at the end thereof adjacent the coaxial inner end of mainshaft 46. Auxiliary section countershaft gears 72 constantly mesh with and support auxiliary section range gear 78 which surrounds the output shaft 58. Accordingly, auxiliary section countershaft gears 68 and splitter gear 74 define a first gear layer, auxiliary section countershaft gears 70 and splitter/range gear 76 define a second gear layer and auxiliary section countershaft gears 72 and range gear 78 define a third layer, or gear group, of the combined splitter and range type auxiliary transmission section 14.

A sliding two-position jaw clutch collar 80 is utilized to selectively couple either the splitter gear 74 or the splitter/range gear 76 to the mainshaft 46 while a two-position synchronized clutch assembly 82 utilized to selectively couple the splitter/range gear 76 or the range gear 78 to the output shaft 58. The structure and function of double-acting jaw clutch collar 80 is substantially identical to the structure and function of the sliding clutch collars 48 and 50 utilized in the main transmission section 12 and the function of double-acting synchronized clutch assembly 82 is substantially identical to the structure and function of prior art double-acting synchronized clutch assembly, examples of which may be seen by reference to U.S. Pat. Nos. 4,462,489; 4,125,179 and 2,667,955 the disclosures of all of which are hereby incorporated by reference. The synchronized clutch assembly 82 illustrated is of the pin-type described in above-mentioned U.S. Pat. No. 4,462,489.

The splitter jaw clutch 80 is a two-position clutch assembly which may be selectively positioned in the rightwardmost or leftwardmost positions for engaging either gear 76 or gear 74, respectively, to the mainshaft 46. Splitter jaw clutch 80 is axially positioned by means of a shift fork 84 controlled by a two-position piston actuator 86 which is operable by a driver selection switch such as a button or the like on the shift knob (not shown) as is known in the prior art. Two-position synchronized clutch assembly 82 is also a two-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a two-position piston device 90.

As may be seen by reference to FIGS. 1, 1A and 6, by selectively axially positioning both the splitter clutch 80 and the range clutch 82 in the forward and rearward axial positions thereof, four distinct ratios of mainshaft rotation to output shaft rotation may be provided. Accordingly, auxiliary transmission section 14 is a three layer auxiliary section of the combined range and splitter type providing four selectable speeds or drive ratios between the input (mainshaft 46) and output (output shaft 58) thereof. The mainsection 12 provides a reverse and three potentially selectable forward speeds. However, one of the selectable mainsection forward gear ratios, the low speed gear ratios associated with mainshaft gear 42, is not utilized in the high range. Thus, transmission 10 is properly designated as a "(2+1)×(2×2)" type transmission providing nine or ten selectable forward speeds, depending upon the desirability and practicality of splitting the low gear ratio.

Figure 2:
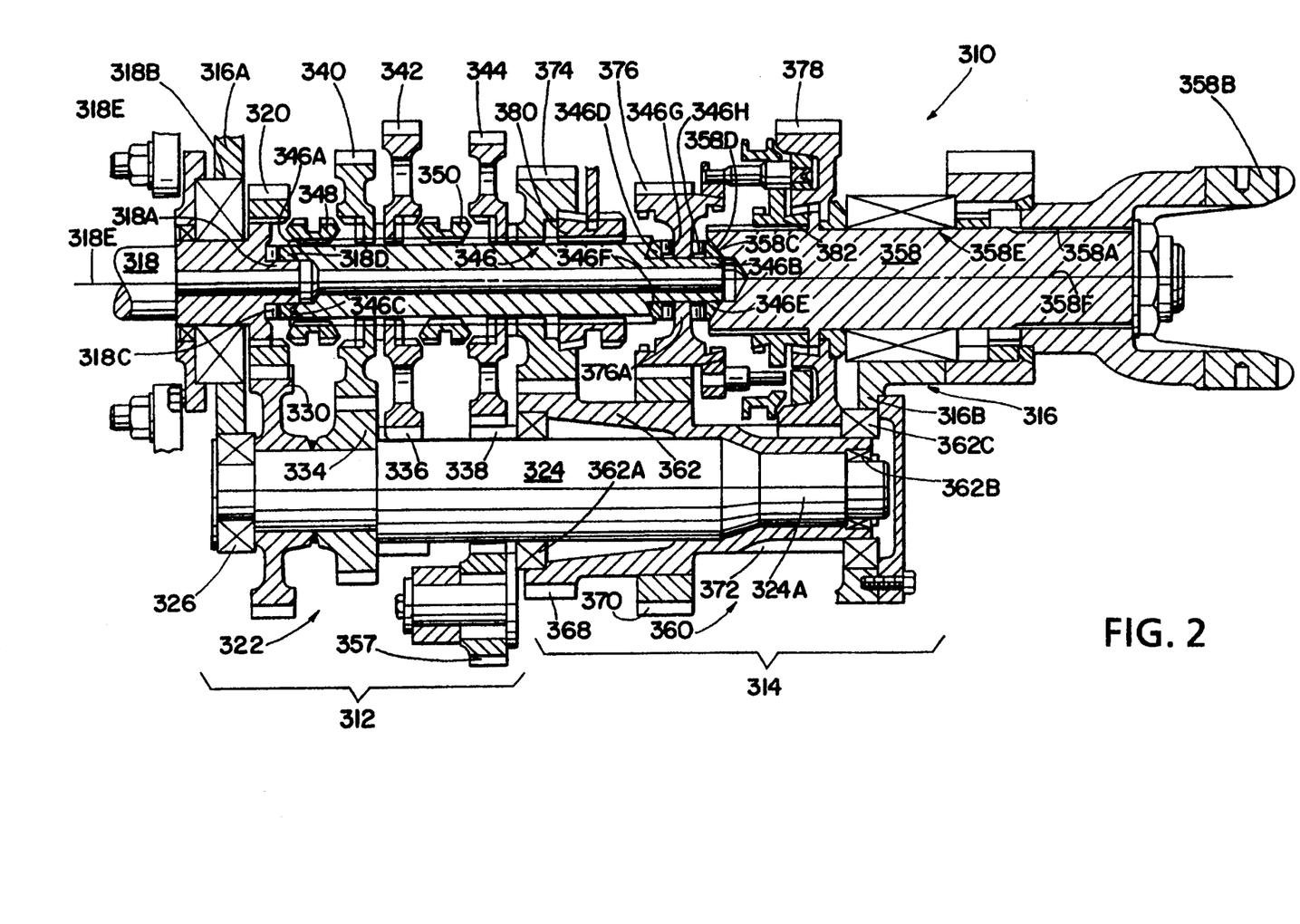
FIG. 2 is a sectional view of a preferred embodiment of the transmission of the present invention.
Figure 3:
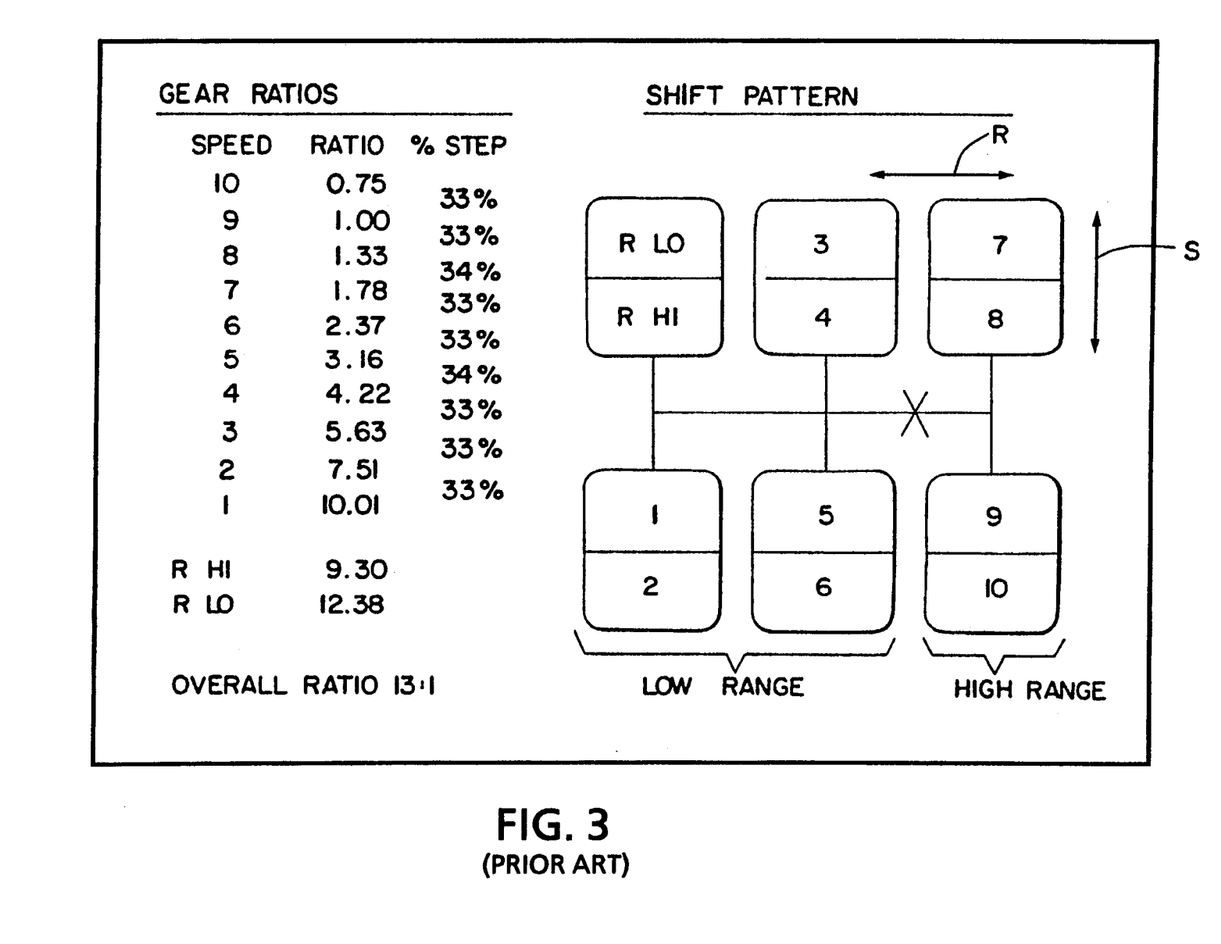
FIG. 3 illustrates a typical shift pattern and typical gear ratios for the transmission of FIGS. 1 or 2.

The shift pattern for shifting transmission 10 is schematically illustrated in FIG. 3. Divisions in the vertical direction at each gear lever position signify splitter shifts while movement in the horizontal direction from the three/four and five/six leg of the H pattern to the seven/eight and nine/ten leg of the H pattern signifies a shift from the low range to the high range of the transmission. As discussed above, splitter shifting is accomplished in the usual manner by means of a vehicle operator actuated splitter button or the like, usually a button located at the shift lever knob while operation of the range clutch shifting assembly is an automatic response to movement of the gear shift lever between the central and rightwardmost legs of the shift pattern as illustrated in FIG. 2 and will be described in greater detail below. Range shift devices of this general type are known in the prior art and may be seen by reference to above-mentioned U.S. Pat. Nos. 3,429,202; 4,455,883; 4,561,325 and 4,663,725.

Referring again to FIG. 3, and assuming that it is desirable that a transmission have generally equal ratio steps, the mainsection ratio steps should be generally equal, the splitter step should be generally equal to the square root of the mainsection ratio steps and the range step should equal about the main section ratio step raised to the N power where N equals the number of mainsection ratio steps occurring in both ranges (i.e., N=2 in the (2+1)×(2×2) transmission 10). Given the desired ideal ratios, gearing to approximate these ratios is selected. In the above example, the splitter steps are about 33.3% while the range step is about 316% which is generally suitable for a "2+1" main transmission section having about 78% steps as the square root of 1.78 equals about 1.33 and 1.78 raised to the second power (i.e. N equals 2) equals about 3.16.

Housing 16, which may be a multiple piece assembly as illustrated, includes a front end wall 16A, a rear end wall 16B and an intermediate wall 16C. It is noted that bearing 28 supporting the rearward end of mainsection countershaft 24, bearing 64 supporting the forward end of auxiliary countershaft 62 and bearing 74A supporting gear 74 and indirectly mainshaft 46 are all supported in the intermediate wall 16C of housing 16.

In transmission 10 described above, and in the other transmissions described and claimed below, countershaft gears are shown as fixed to the countershafts while certain of the mainshaft and/or output shift gears are shown as selectively clutchable to the shafts associated therewith. While this is the preferred construction, the present invention is equally applicable to a functionally equivalent structure wherein certain of the mainshaft and/or output shaft gears are fixed to their associated shafts and the countershaft gears are selectively clutchable to the countershafts.

Figure 2A:
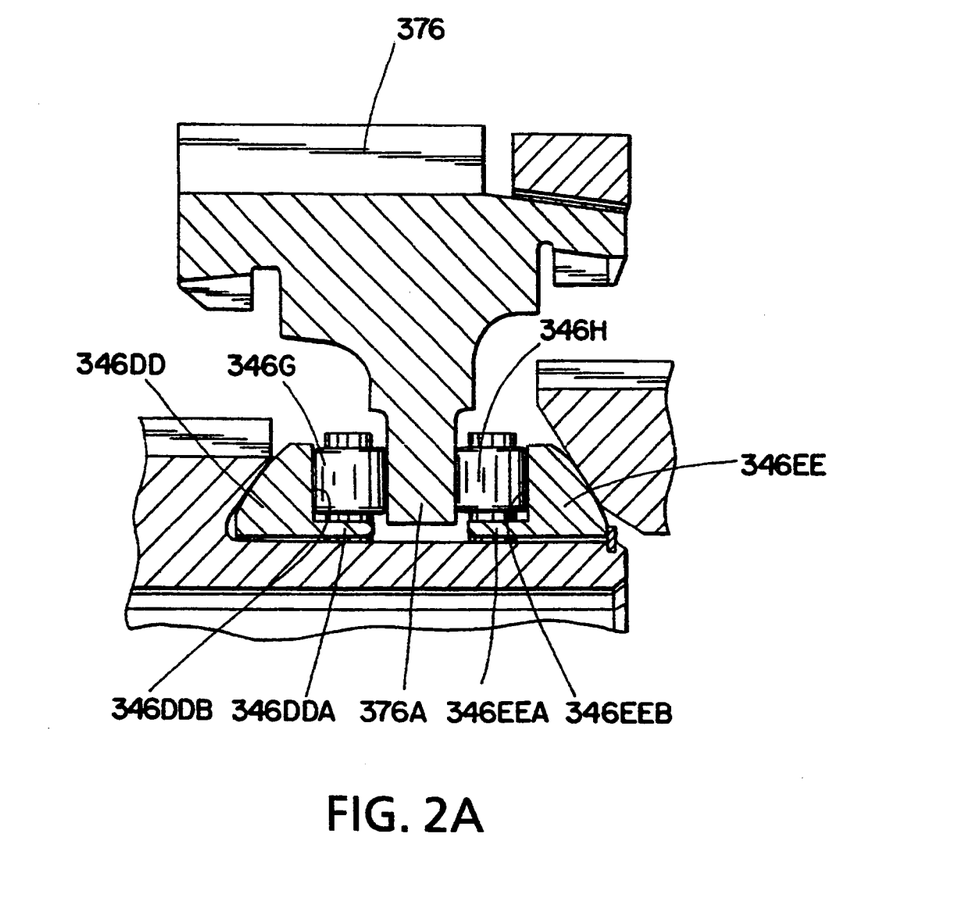
FIG. 2A is a partial view illustrating structural modification of the transmission of FIG. 2.

In FIGS. 2 and 2A 10-speed transmission 310 is illustrated. Transmission 310 utilizes the structure of the present invention. The function and operation, but not the structures, of the parts of transmission 310 is identical to the function and operation of the parts of transmission 10 illustrated in FIGS. 1 and 1A. Parts of transmission 310 corresponding functionally and operationally to parts of transmission 10 will be assigned like reference numerals with "3" prefixed thereto.

Transmission 310, a preferred embodiment of the present invention, has been designed primarily for helical gearing. Prior art transmission 10 described above is suitable primarily for spur gearing. Helically geared twin countershaft compound transmissions are known in the art as may be seen by reference to U.S. Pat. Nos. 2,700,311; 3,885,446 and 4,876,908, the disclosures of which are incorporated herein by reference.

As with transmission 10 described above, transmission 310 is a "(2+1)×(2×2)" type compound transmission comprising a main section 312 and an auxiliary section 314 connected in series therewith, both within a common housing 316 having a forward 316A and a rearward 316B end wall but not an intermediate wall corresponding to intermediate wall 16C of prior art transmission 10.

While the preferred embodiment of the present invention have been illustrated as "(2+1)×(2×2)" compound transmission, the present invention is not so limited and is applicable to a wide variety of types of compound transmissions.

Input shaft 318 carries input gear 320 fixed for rotation therewith and defines an inwardly extending reduced diameter portion 318A which directly or indirectly supports the front end 346A of mainshaft 346. Output shaft 358 extends from the rear end of transmission 310 and carries splines 358A for receipt of an output flange 358B. The inner end 358C of output shaft 358 is provided with an inwardly and rearwardly tapered surface 358D for direct or indirect support of the rear end 346B of mainshaft 346.

Input shaft 318 is supported in front end wall 316A by taper roller bearing 318B while output shaft 358 is supported in rear end wall 316B by dual taper roller bearing assembly 358E.

The mainshaft 346 carries mainshaft clutches 348 and 350 and the splitter clutch 380, and extends generally coaxially between and is supported by the inner ends of the input and output shafts. Mainshaft gears 340, 342 and 344, splitter gear 374 and splitter/range gear 376 surround the mainshaft, preferably for limited radial movement relative thereto, and are selectively clutchable thereto by clutches 348, 350 and 380. Range clutch 382 is carried by output shaft 358 which is surrounded by splitter/range gear 376 and range gear 378. Clutch 382 is effective to clutch either gear 376 or gear 378 to the output shaft 358. The function and operation of transmission 310 is the same as that of transmission 10, 110 and 210 discussed above.

The countershaft assemblies 322 and 360, respectively, are substantially functionally and operatively identical to the mainsection and auxiliary countershaft assemblies 22 and 60 of transmission 10 described below. Briefly, mainsection countershaft(s) 324 carries countershaft gears 330, 334, 336 and 338 fixed thereto which are constantly meshed with and/or support, input gear 320, mainshaft gears 340, 342, 344 and idler gear 357 while auxiliary countershaft(s) 362 carries auxiliary countershaft gears 368. 370, 372 which are constantly meshed with splitter, splitter/range and range gears 374, 376 and 378, respectively. The auxiliary countershafts 362 are generally tubular and telescopically surround the rear end 324A of the mainsection countershafts and are directly or indirectly rotatably supported by bearings 362A, 362B and 362C thereon. A beating 326 supports the forward end of main section countershaft 324 in front wall 316A while a bearing 362C supports, directly or indirectly, the rearward end of main section countershaft 324 in the rear end wall 316B.

The reduced diameter extension 318A of the input shaft 318 carries an axial roller bearing 318C and a generally spherical washer 318D of bearing steel which will abut a generally complimentary radially inwardly and axially rearwardly tapered surface 346C provided on the front end 346A of the mainshaft 346. The hub portion 376A of range/splitter gear 376 surrounds the reduced diameter rearward portion 346B of the mainshaft 346 which also carries two spherical washers 346D and 346E, structurally identical to washer 318D, which interact with generally complimentary inclined surfaces 346F on the mainshaft and 358D on the output shaft, respectively. Axial roller beatings 346G and 346H separate the spherical washers from the hub portion 376A.

Axial bearings are bearings designed to transmit an axial load between two relatively rotatable members. A typical axial bearing will include rollers having an axis of rotation extending radially relative to the axis of rotation 318E/358F of the relatively rotating parts.

The mainshaft 346 is thus supported directly or indirectly at its front end by input shaft 318 while the spherical washer 318D and surface 346C allow for a limited amount of radial movement of the mainshaft relative to the axis of rotation 318E of the input shaft. The mainshaft is supported directly or indirectly at its rear end by the output shaft 358 while spherical washers 346D and 346E interact with tapered surfaces 346F and 358D to allow a limited amount of radial movement of the mainshaft relative to the axis of rotation 358F of the output shaft 358 which is substantially coaxial with axis 318E.

As indicated previously, all or substantially all of the gearing of transmission 310 is helical which may result in the creation of axial forces on the various transmission components. Forward axial forces on the mainshaft 346 and/or on the splitter/range gear 376 will be transferred to the housing through bearings 346G, 318C and/or 318B while rearward axial forces on the mainshaft and splitter/range gear will be transferred to the housing through bearings 346G, 346H and/or 358E.

Accordingly, the mainshaft 346 is supported solely by the input and output shafts, preferably with a limited degree of radial freedom or float, requiting no intermediate support to the housing and allowing the transfer of axial forces associated with helical gearing to the housing through appropriate bearings.

As with transmission 10, one or more of the jaw clutches 348, 350 and/or 380 could be blocked and/or synchronized. While the structure of the present invention is especially advantageous for multiple substantially identical countershaft type transmissions, it is also applicable to single countershaft and swap shaft type transmissions.

FIG. 2A illustrates a structural modification to transmission 310. Briefly, the spherical washers 346DD and 346EE replace the washers 346D and 346E illustrated in FIG. 2. Washers 346DD and 346EE include axially extending hubs 346DDA and 346EEA which provide a pilot surface for bearings 346G and 346H respectively to maintain the bearing cages and rollers parallel to surfaces 346DDB and 346EEB respectively.

Transmission 310 is functionally and operationally identical to prior art transmission 10 described above. Transmission 310 differs structurally from transmission 10 in that the mainshaft 346 is supported solely by the input and/or output shafts, one of the countershafts, mainsection countershafts 324, extend from the front end wall 316A to the rear end wall 316B and the other countershafts, auxiliary countershafts 362, are tubular members telescopically surrounding the one of the countershafts. This improved structure allows elimination of the intermediate wall 16C and bearings 28, 64 and 74A required for transmission 10. Compared to transmission 10, for similar capacity and reliability, transmission 310 is considerably shorter and lighter. By way of example, for a 1450 lbs. ft. input torque transmission, transmission 10 will have a length of about 25.8 inches and weight of about 634 lbs. compared to an estimated length of about 20.5 inches and weight of about 465 lbs. for transmission 310 of the present invention.

Figure 4:
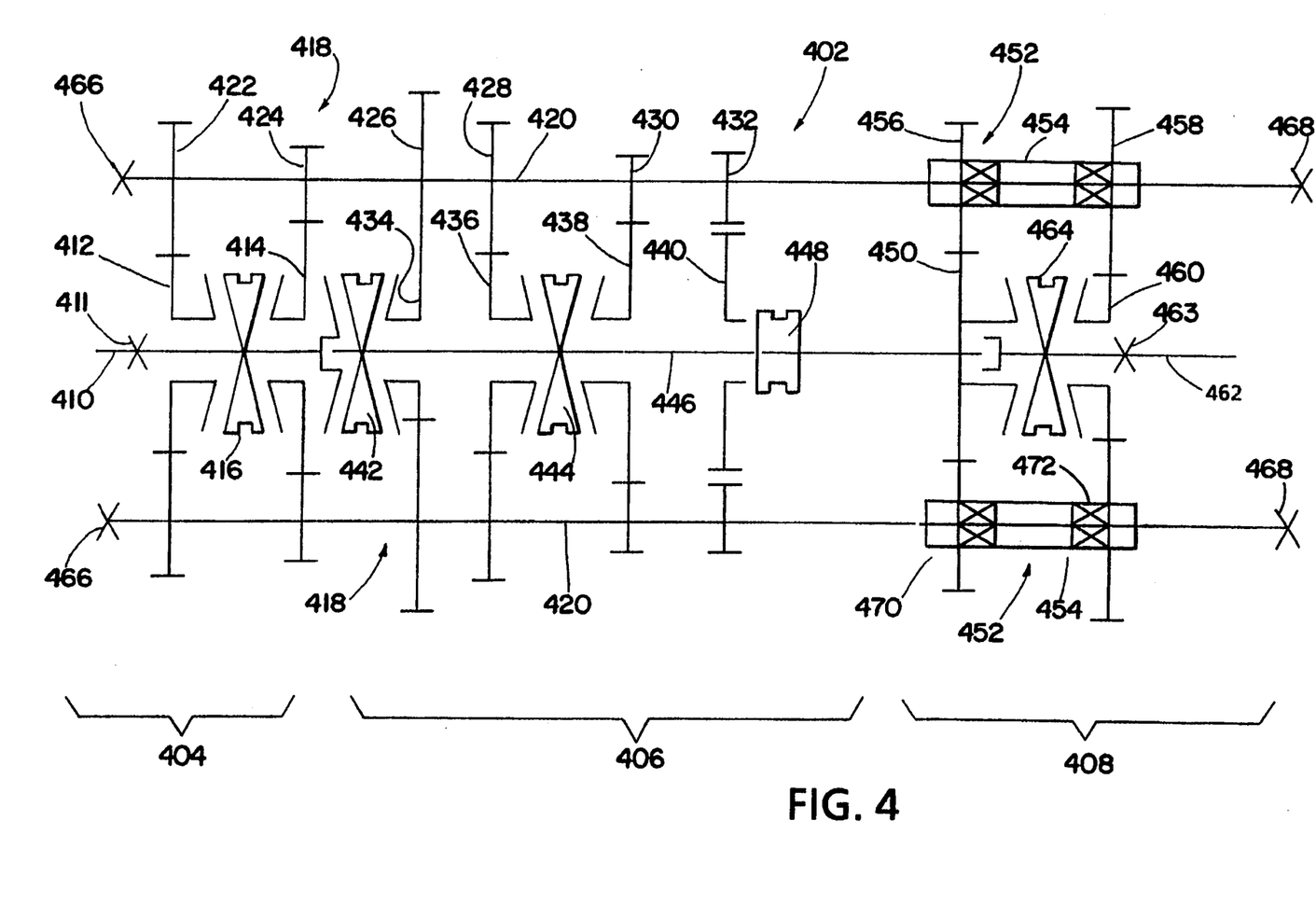
FIG. 4 illustrates a further alternate embodiment of the present invention.

A further alternate embodiment of the present invention, transmission 402, is schematically illustrated in FIG. 4. Unlike transmissions 10, 110, 210 and 310 described above, transmission 402 is a "(2)×(4)×(2)" type 16-speed transmission having a two-speed splitter section 404, a four forward-speed mainsection 406 and a two-speed range section 408, all connected in series. The gearing of transmission 402 may be helical.

Briefly, an input shaft 410 is supported in the transmission housing forward wall (not shown) by bearing 411 and is surrounded by two input gears 412 and 414, a selected one of which is clutched to the input shaft by synchronized clutch 416 to provide a two-speed splitter input section. Front countershaft assemblies 418 each include a countershaft 420 carrying countershaft gears 422, 424, 426, 428, 430 and 432. Gears 422 and 424 are constantly meshed with the input gears 412 and 414. In mainsection 416, gears 426, 428, 430 and 432 are constantly meshed with mainshaft gears 434, 436, 438 and a reverse idler (not shown) meshed with reverse mainshaft gear 440. Double acting synchronized clutches 442 and 444 are provided on mainshaft 446 to clutch the mainshaft 446 to a selected one of the input shaft 410 or mainshaft gears 434, 436 or 438. Non-synchronized clutch 448 is used to clutch the reverse mainshaft gear 440 to the mainshaft 446.

The rearward end of mainshaft 446 extends into the two-speed range section 408 and carries gear 450 fixed for rotation therewith. A pair of auxiliary section countershaft assemblies 452 each include an auxiliary section countershaft 454 carrying two auxiliary section countershaft gears 456 and 458. Gear 456 is constantly meshed with auxiliary input gear 450 while gear 458 is constantly meshed with an output gear 460 surrounding output shaft 462. Output shaft 462 is supported in the housing rear end wall (not shown) by bearing(s) 463. A two-position synchronized range clutch 464 is carded by the output shaft 462 and is utilized to clutch either output gear 460 or mainshaft 446 to the output shaft 462.

Bearings 466 and 468 are used to rotatably mount the front countershafts 420 to the forward and rearward end walls (not shown) of a transmission housing. Auxiliary countershafts 454 are generally tubular members telescopically surrounding the rear ends of the front countershafts and maybe supported thereon by needle bearings 470 and 472 or the like. The mainshaft is supported by the input shaft and/or output shaft in a manner similar that illustrated in either transmission 110, 210 or 310 described above.

Figure 5:
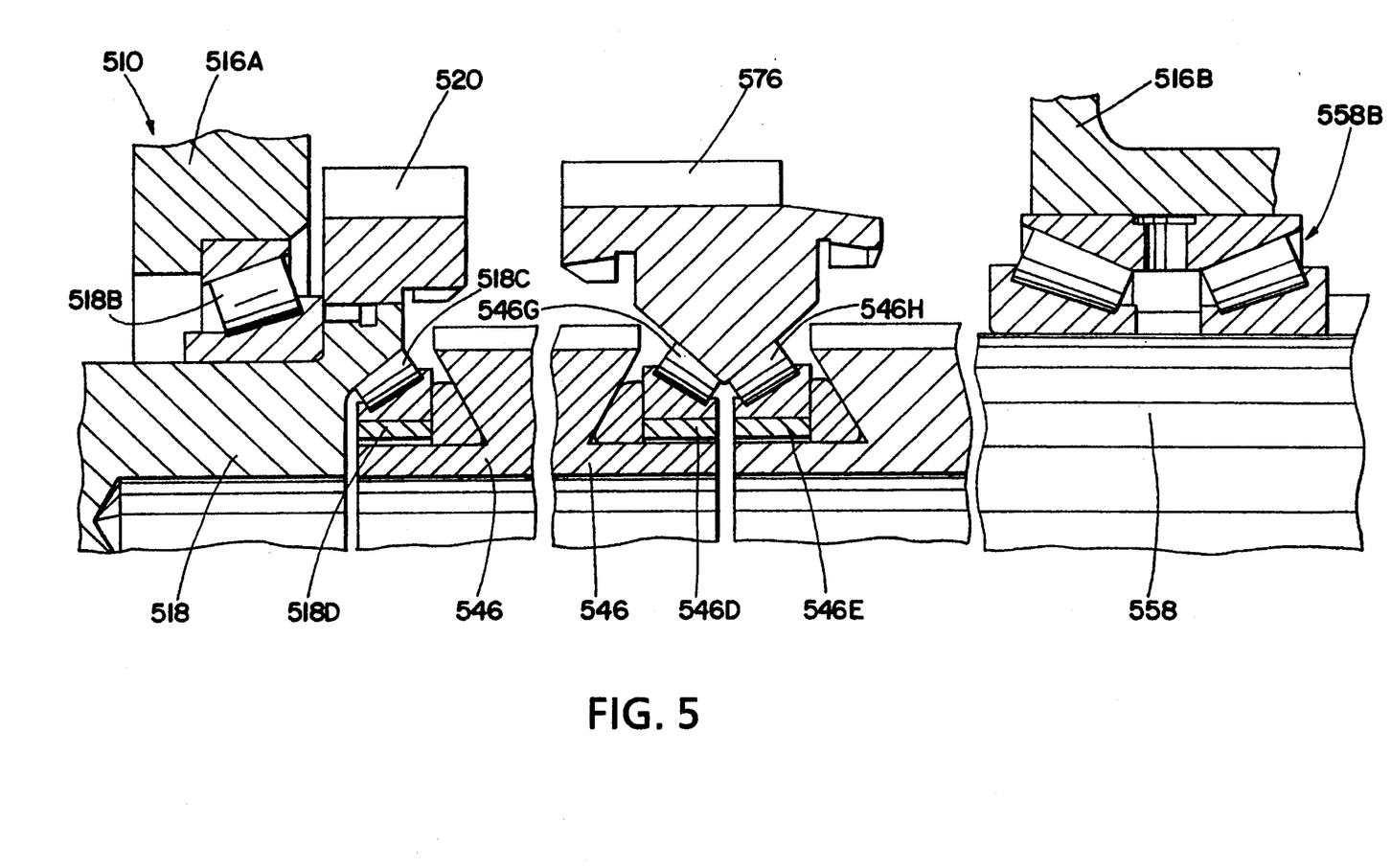
FIG. 5 is a partial sectional view of an alternate embodiment of the present invention.

A further alternate embodiment 510 of the present invention is illustrated in FIG. 5. Transmission 510 is similar to transmission 310 except that the rearward end of mainshaft 546 and the forward end of output shaft 558 each support and are supported by splitter/range gear 576 through spherical washers 546D and 546E and taper roller bearings 546G and 546H and axial bearings 318C, 346G and 346H are replaced by taper roller beatings 518C, 546G and 546H, respectively.

Although the present invention has been described with a certain degree of particularity, it is understood that various changes to form and detail may be made without departing from the spirit and the scope of the invention as hereinafter claimed.

We claim:

1. A compound helically geared vehicular transmission (310) comprising a multiple speed main transmission section (312) connected in series with a multiple speed auxiliary transmission section (314) said first and second transmission sections contained within a common transmission housing (316) defining a forward end wall (316A) and a rearward end wall (316B);

said main transmission section comprising an input shaft (318) supported for rotation in said housing by input shaft bearing means (318B) carried by said forward end wall, at least one input gear (320) fixable to said input shaft, a mainshaft (346) generally coaxial with said input shaft and extending into said auxiliary transmission section, a plurality of substantially identical main section countershafts (324) rotatably supported in said housing and driven by said input gear, a plurality of main section countershaft gears (334, 336, 338) fixed to each of said main section countershafts, a plurality of mainshaft gears (340, 342) surrounding said mainshaft and constantly meshed with a plurality of said main section countershaft gears and main section clutch means (348, 350) carried by said mainshaft for selectively fixing said mainshaft gears to said mainshaft for rotation therewith;

said auxiliary transmission section comprising a plurality of substantially identical auxiliary section countershafts (362) coaxial with said main section countershafts and rotatably supported in said housing, an output shaft (358) generally coaxial with said mainshaft rotatably supported in said housing by output shaft bearing means (358E) carried by said rearward end wall (316B), an auxiliary section countershaft gear fixed to each of said auxiliary section countershafts, at least one output gear (374, 376, 378) generally coaxial with said output shaft and constantly meshed with a plurality of said auxiliary section countershaft gears and auxiliary section clutch means (380, 382) for selectively clutching at least one of said output gears and said mainshaft to said output shaft:

said transmission characterized by:

the coaxial ones of said main section and auxiliary section countershafts being independently rotatable in said housing and together defining a coaxial assembly of countershafts rotatably supported in said housing solely by bearing means (326, 362B, 362C) mounted in said forward end wall and in said rearward end wall; and said mainshaft is supported in said housing solely by said input shaft and said output shaft.

2. The compound helically geared transmission of claim 1 wherein one of said main transmission section and said auxiliary transmission section countershafts defines a generally tubular portion telescopically surrounding a portion of the other of said main transmission section and auxiliary transmission section countershafts.

3. The compound helically geared transmission of claim 2 wherein said mainshaft and said mainshaft gears are radially floatable relative to the axis of rotation of said input shaft and said output shaft.

4. The compound helically geared transmission of claim 3 wherein a single input gear is permanently fixed to said input shaft for rotation therewith.

5. The compound helically geared transmission of claim 3 wherein a plurality of input gears (412, 414) surround said input shaft for rotation relative thereto and an input clutch (416) is provided for selectively rotationally fixing a selected one of said input gears to said input shaft.

6. The compound helically geared transmission of any one of claims 1, 2, 3, 4 or 5 wherein the rearward end of said input shaft is provided with a generally tapered surface for abutting engagement with a generally complimentary tapered surface provided on the forward end of said mainshaft.

7. The compound helically geared transmission of any one of claims 1, 2, 3, 4 or 5 wherein the forward end of said output shaft is provided with a tapered surface for abutting engagement with a generally complimentary tapered surface provided on the rearward end of said mainshaft.

8. The compound helically geared transmission of claim 7 wherein the rearward end of said input shaft is provided with a tapered surface for abutment with a generally complimentary tapered surface provided on the forward end of said mainshaft.

9. The compound-helically geared transmission of any one of claims 1, 2, 3, 4 or 5 wherein one of the rearward end of said input shaft and the forward end of said mainshaft define a tapered surface abutting with a generally spherical washer carried by the other of said rearward end of said input shaft and forward end of said mainshaft.

10. The compound helically geared transmission of claim 9 wherein said other of said rearward end of said input shaft and the forward end of said mainshaft defines a generally radially extending surface facing the one of said rearward end of said input shaft and forward end of said mainshaft, and further comprising an axial bearing member interposed said surface and a generally radially extending surface on said spherical washer.

11. The compound helically geared transmission of claim 9 wherein said spherical washer is made of a bearing steel.

12. The compound helically geared transmission of claim 10 wherein said spherical washer is made of a bearing steel.

13. The compound helically geared transmission of claim 10 wherein said washer defines a reduced diameter hub extending from said radially extending face, said axial bearing defining an inner diameter surface piloted on the outer diameter surface of said hub.

14. The compound helically geared transmission of claim 12 wherein said washer defines a reduced diameter hub extending from said radially extending face, said axial beating defining an inner diameter surface piloted on the outer diameter surface of said hub.

15. The compound helically geared transmission of claim 9 wherein said one of the rearward end of said input shaft and the forward end of said mainshaft is the forward end of said mainshaft and said tapered surface extends radially inwardly and axially rearwardly.

16. The compound helically geared transmission of claim 10 wherein said one of the rearward end of said input shaft and the forward end of said mainshaft is the forward end of said mainshaft and said tapered surface extends radially inwardly and axially rearwardly.

17. The compound helically geared transmission of claim 13 wherein said one of the rearward end of said input shaft and the forward end of said mainshaft is the forward end of said mainshaft and said tapered surface extends radially inwardly and axially rearwardly.

18. The compound helically geared transmission of any one of claims 1, 2, 3, 4 or 5 wherein one of the forward end of said output shaft and the rearward end of said mainshaft define a tapered surface abutting with a generally spherical washer carried by the other of said forward end of said output shaft and rearward end of said mainshaft.

19. The compound helically geared transmission of claim 18 wherein said other of said forward end of said output shaft and the rearward end of said mainshaft defines a generally radially extending surface facing the one of said forward end of said output shaft and rearward end of said mainshaft, and further comprising an axial beating member interposed said surface and a generally radially extending surface on said spherical washer.

20. The compound helically geared transmission of claim 18 wherein said spherical washer is made of a bearing steel.

21. The compound helically geared transmission of claim 19 wherein said spherical washer is made of a bearing steel.

22. The compound helically geared transmission of claim 19 wherein said washer defines a reduced diameter hub extending frown said radially extending face, said axial bearing defining an inner diameter surface piloted on the outer diameter surface of said hub.

23. The compound helically geared transmission of claim 21 wherein said washer defines a reduced diameter hub extending frown said radially extending face, said axial bearing defining an inner diameter surface piloted on the outer diameter surface of said hub.

24. The compound helically geared transmission of claim 18 wherein said one of the forward end of said output shaft and the rearward end of said mainshaft is the rearward end of said mainshaft and said tapered surface extends radially inwardly and axially rearwardly.

25. The compound helically geared transmission of claim 19 wherein said washer defines a reduced diameter hub extending frown said radially extending face, said axial bearing defining an inner diameter surface piloted on the outer diameter surface of said hub.

26. The compound helically geared transmission of claim 22 wherein said one of the forward end of said output shaft and the rearward end of said mainshaft is the rearward end of said mainshaft and said tapered surface extends radially inwardly and axially rearwardly.

27. A compound helically geared vehicular transmission (310) comprising a multiple speed main transmission section (312) connected in series with a multiple speed combined splitter and range type auxiliary transmission section (314) said first and second transmission sections contained within a common transmission housing (316) defining a forward end wall (316A) and a rearward end wall (316B);

said main transmission section comprising an input shaft (318) supported for rotation in said housing by input shaft beating means (318B) carded by said forward end wall, at least one input gear (320) fixable to said input shaft, a mainshaft (346) generally coaxial with said input shaft and extending into said auxiliary transmission section, a plurality of substantially identical main section countershafts (324) rotatably supported in said housing and driven by said input gear, a plurality of main section countershaft gears (334, 336, 338) fixed to each of said main section countershafts, a plurality of mainshaft gears (340, 342) surrounding said mainshaft and constantly meshed with a plurality of said main section countershaft gears and main section clutch means (348, 350) carried by said mainshaft for selectively fixing said mainshaft gears to said mainshaft for rotation therewith;

said auxiliary transmission section comprising a plurality of substantially identical auxiliary section countershafts (362) coaxial with said main section countershafts and rotatably supported in said housing, an output shaft (358) generally coaxial with said mainshaft rotatably supported in said housing by output shaft beating means (358E) carried by said rearward end wall (316B), a plurality of auxiliary section countershaft gears fixed to each of said auxiliary section countershafts, a plurality of auxiliary section central gears (374, 376, 378) generally coaxial with said output shaft and constantly meshed with a plurality of said auxiliary section countershaft gears and auxiliary section clutch means (380, 382) for selectively clutching said auxiliary section central gears to one of said mainshaft and said output shaft;

said transmission characterized by:

the coaxial ones of said main section and auxiliary section countershafts being independently rotatable in said housing and together defining an assembly of countershafts rotatably supported in said housing solely by bearing means (326, 362C) mounted in said forward end wall and in said rearward end walls one of said main transmission section and said auxiliary transmission section countershafts defining a generally tubular portion telescopically surrounding a portion of the other of said main transmission section and auxiliary transmission section countershafts; and said mainshaft is supported in said housing solely by said input shaft and said output shaft and said mainshaft and said mainshaft gears are radially floatable relative to the axis of rotation of said input shaft and said output shaft, the rearward end of said input shaft being provided with a generally tapered surface for abutting engagement with a generally complimentary tapered surface provided on the forward end of said mainshaft and the forward end of said output shaft being provided with a tapered surface for abutting engagement with a generally complimentary tapered surface provided on the rearward end of said mainshaft.

28. The helically geared compound transmission of claim 27 wherein the forward end of said mainshaft defining integral tapered surface abutting with a generally spherical washer carried by the rearward end of said input and the rearward end of said mainshaft defines an integral tapered surface abutting with a generally spherical washer carried by the forward end of said output shaft.

29. The compound transmission of claim 28 wherein the rearward end of said input shaft and the forward end of said output shaft each defines a generally radially extending surface and an axial bearing member is interposed each of said surface and a generally radially extending surface on each of said spherical washer.

30. The helically geared compound transmission of claim 28 wherein said spherical washer is made of a bearing steel.

31. The helically geared compound transmission of claim 29 wherein said spherical washer is made of a bearing steel.

32. The compound helically geared transmission of claim 29 wherein each of said washers defines a reduced diameter hub extending axially away from said radially extending face, each of said axial bearings defining an inner diameter surface piloted on the outer diameter surface of one of said hubs.

33. The compound helically geared transmission of claim 30 wherein each of said washers defines a reduced diameter hub extending axially away from said radially extending face, each of said axial bearings defining an inner diameter surface piloted on the outer diameter surface of one of said hubs.

34. The compound helically geared transmission of claim 29 wherein said auxiliary section includes an auxiliary central gear selectively clutchable to both said mainshaft and said output shaft, said auxiliary section gear including a radially inwardly extending hub portion defining a pair of parallel opposed surfaces, an additional radial bearing and spherical washer abutting each of said surfaces with said spherical washers abutting said mainshaft and output shaft on complimentary tapered surfaces provided thereon.

35. The compound helically geared transmission of claim 30 wherein said auxiliary section includes an auxiliary central gear selectively clutchable to both said mainshaft and said output shaft, said auxiliary section gear including a radially inwardly extending hub portion defining a pair of parallel opposed surfaces, an additional radial bearing and spherical washer abutting each of said surfaces with said spherical washers abutting said mainshaft and output shaft on complimentary tapered surfaces provided thereon.

36. The compound helically geared transmission of claim 34 wherein each of said washers defines a reduced diameter hub extending axially away from said radially extending face, each of said axial bearings defining an inner diameter surface piloted on the outer diameter surface of one of said hubs.

37. A compound helically geared vehicular transmission (310) comprising a multiple speed main transmission section (312) connected in series with a multiple speed auxiliary transmission section (314) said first and second transmission sections contained within a common transmission housing (316) defining a forward end wall (316A) and a rearward end wall (316B);

said main transmission section comprising an input shaft (318) supported for rotation in said housing by input shaft beating means (318B) carried by said forward end wall, at least one input gear (320) fixable to said input shaft, a mainshaft (346) generally coaxial with said input shaft and extending into said auxiliary transmission section, a plurality of substantially identical main section countershafts (324) rotatably supported in said housing and driven by said input gear, a plurality of main section countershaft gears (334, 336, 338) fixed to each of said main section countershafts, a plurality of mainshaft gears (340, 342) surrounding said mainshaft and constantly meshed with a plurality of said main section countershaft gears and main section clutch means (348, 350) carried by said mainshaft for selectively fixing said mainshaft gears to said mainshaft for rotation therewith;

said auxiliary transmission section comprising a plurality of substantially identical auxiliary section countershafts (362) coaxial with said main section countershafts and rotatably supported in said housing, an output shaft (358) generally coaxial with said mainshaft rotatably supported in said housing by output shaft bearing means (358E) carded by said rearward end wall (316B), an auxiliary section countershaft gear fixed to each of said auxiliary section countershafts, at least one output gear (374, 376, 378) generally coaxial with said output shaft and constantly meshed with a plurality of said auxiliary section countershaft gears and auxiliary section clutch means (380, 382) for selectively clutching at least one of said output gears and said mainshaft to said output shaft;

said transmission characterized by:

the coaxial ones of said main section and auxiliary section countershafts being independently rotatable in said housing and together defining a coaxial assembly of countershafts rotatably supported in said housing solely by bearing means (326, 362B, 362C) mounted in said forward end wall and in said rearward end wall; and said input shaft, mainshaft and output shaft being supported in said housing solely by bearing means mounted in said forward end wall and in said rearward end wall.

* * * * *